United States Patent Office

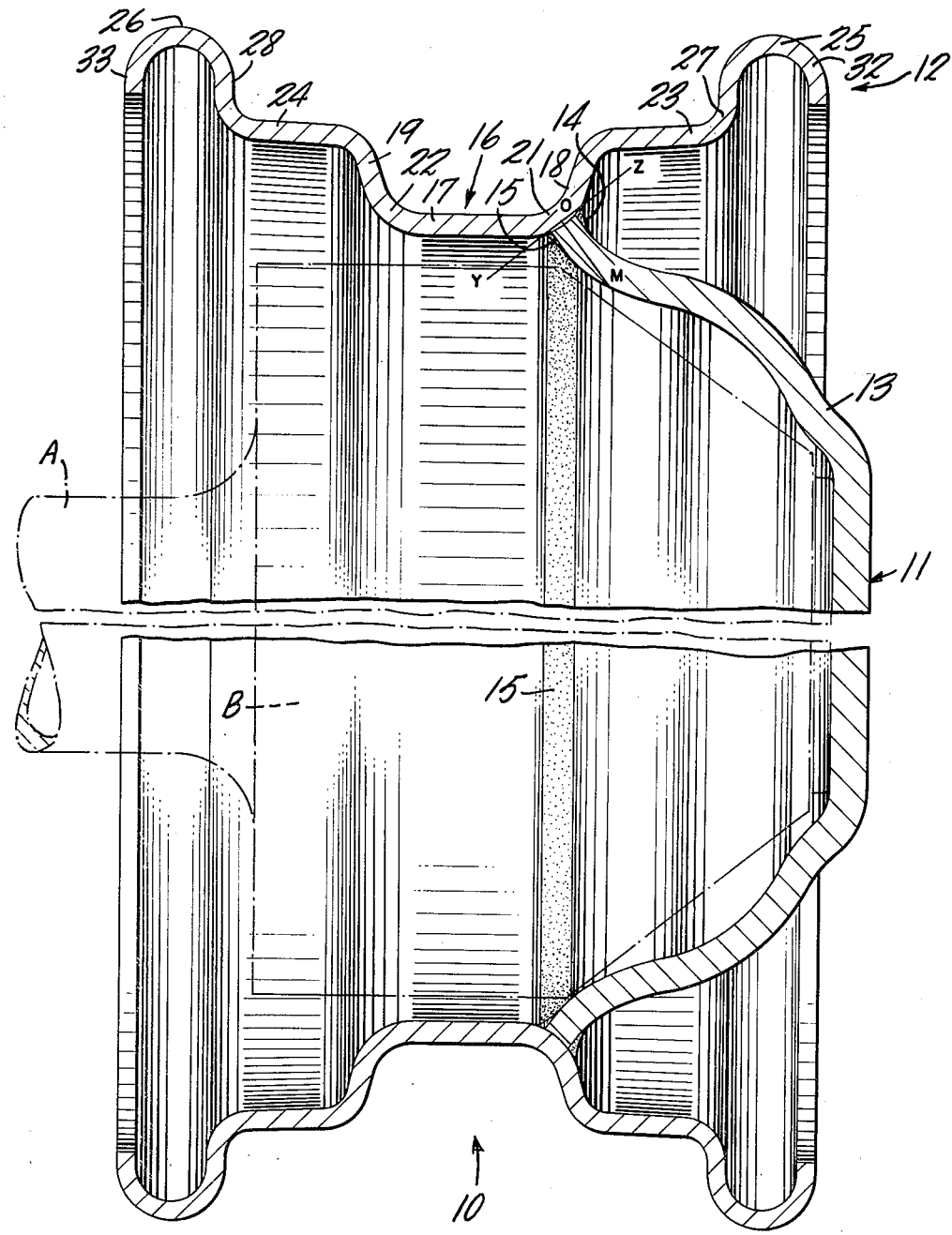

3,210,126
Patented Oct. 5, 1965

3,210,126
WHEEL
Georges Louis Travers, Clermont-Ferrand, France, assignor to Compagnie Generale des Etablissements Michelin, raison sociale Michelin & Cie, Clermont-Ferrand, France
Filed July 30, 1963, Ser. No. 298,706
Claims priority, application France, July 31, 1962, 1,773, Patent 1,338,442; June 12, 1963, 937,925, Patent 1,338,442
1 Claim. (Cl. 301—63)

The present invention relates to wheels and, more particularly, to wheels adapted for use on motor vehicles such as the automobile.

Wheels for use on motor vehicles such as the automobile are, in their conventional form, deficient in a number of respects. Generally, such wheels have a rim spaced apart from a hub and a disc or similar member connecting the hub and the rim. The disc is typically welded to the rim, and as the wheel rolls along the ground, the weld is subject alternately to forces of compression and tension. Welds do not stand up well under tension, and the weld between the disc and the rim therefore tends to develop cracks, so that the wheel becomes unsafe, particularly in high-speed travel.

Further, in conventional wheels for vehicles such as the automobile, the disc connecting the hub and the rim is so mounted as to reduce the space available for the mounting of the brake.

To keep the tire in position, conventional wheels also have rim flanges which are raised with respect to the rim base, but the thickness of these flanges has to be comparatively great to be sufficiently strong. Conventional flanges also make it difficult to put the tire on and take it off the wheel.

Conventional wheels also have a well base between the two rim seats. The well base must have a certain depth in order to allow the tire to be put on the rim easily, and it therefore also reduces the space available for the mounting of the brake.

An object of the present invention is to remedy the deficiencies in conventional apparatus pointed out above. In particular, an object of the invention is to provide a wheel wherein the wheel disc or other means connecting the hub and the rim is connected to the rim at a region where the rim is subject to compression stresses only, so that the weld between the disc and the rim is not subject to tension and is therefore safer and longer lasting.

Another object of the invention is to provide an improved rim flange having greater strength without being made thicker and at the same time to make it easier to install and remove a tire when it is necessary to do so.

A further object of the invention is to provide a well-base wheel wherein the depth of the well is less than in conventional wheels having such a well.

These and other objects of the invention are attained by providing a wheel comprising a hub, a rim spaced apart from the hub and having a well base formed with a bottom wall and a side wall, the side wall bodering the bottom wall and intersecting it along a generally circular shoulder, and connecting means connecting the hub and the shoulder. The connecting means preferably forms at the shoulder equal or nearly equal angles with the bottom wall and the side wall. Thus, the angles formed by the connecting means with the tangent to the circular shoulder between the bottom wall and the side wall are right angles or angles which may depart from the right angles by a certain amount, preferably small and not exceeding in any case 30 degrees. The connecting means include one or more fillet welds. The rim of the invention may also comprise a rim flange bodering the tire bead seat, the rim flange having a first side intersecting the bead seat and a second side opposite the first side, the second side being curved way from the rim base and towards the axis of the wheel through an arc of at least 120°. Preferably, the arc is approximately 180°.

The rim of the invention may also have a well base of a depth from 2% to 15% less than the depth of the base specified by the 1962 Year Book of the Tire and Rim Association.

For an understanding of further particulars of the invention, reference may be made to the following detailed description of a representative embodiment thereof and to the accompanying figure in the drawing, which is a fragmentary sectional view in elevation of a wheel constructed in accordance with the invention.

The figure shows a wheel 10 mounted on an axle A, housing a brake B, and having a hub 11 and a rim 12 spaced apart from the hub 11. Connecting means such as a connecting disc 13 connects the hub 11 and the rim 12. The connecting means includes fillet welds 14 and 15, which are joined to the rim 12, and extends outwardly of the outermost plane of a rim flange 25 disclosed in detail hereinafter.

The rim 12 has a well base 16 formed with a bottom wall 17 and an outer side wall 18 and an inner side wall 19. The side walls border the bottom wall respectively on the outer and inner sides thereof and intersect the bottom wall 17 along outer and inner shoulders 21 and 22. The shoulders 21 and 22 are generally circular, their centers lying on the wheel axis.

In accordance with the invention, the disc 13 is connected with its outer edge to the rim 12 along the outer shoulder 21. Also in accordance with the invention, the disc 13 forms substantially equal angles at the shoulder 21 with the bottom wall 17 and the outer wall 18. That is, the angle MOY, formed by a portion of the disc 13 adjacent to the rim 12 and a portion of the rim 12 adjacent to the disc 13 on the inner side thereof, is substantially equal to the angle MOZ, formed by the same portion of the disc 13 and a portion of the rim 12 adjacent to the disc 13 on the outer side thereof.

The rim also has first and second tire bead seats 23 and 24 on opposite sides of the well base 16 and first and second rim flanges 25 and 26 respectively bordering the first and second bead seats 23 and 24 on opposite sides thereof. The rim flanges have first sides 27 and 28 respectively intersecting the first and second bead seats 23 and 24 and second sides 32 and 33 respectively opposite the first sides 27 and 28. In accordance with the invention, the second sides are curved away from the bead seats 23 and 24 and from each other and towards the axis of the wheel through arcs of at least 120° or, preferably, as shown in the figure, approximately 180°. The centers of the arcs are circles concentric with the wheel axis. The curvature of the rim flanges in accordance with the invention strengthens them, decreases the strain on them and makes the mounting of the tire easier. The curvature of the rim flanges in accordance with the invention is particularly advantageous in combination with the reduced well depth, also provided for by the invention and described elsewhere in the present specification.

The zone of the rim in which the fillet welding of the disc to the rim is effected in accordance with the invention is subject mainly to compression stresses. Thus, the welding beads are not under tensile stress. This is an advantage because welding responds poorly to tensile stresses, and cracks due to the stresses build up mainly in zones subject to tension. Making the weld in a zone subject to compression stresses only results in a safer and stronger wheel.

Moreover, a greater manufacturing tolerance is provided in accordance with the invention in the area where the disc edge joins the rim. That is, the fit between the two need be less exact than in the case of conventional wheels. In conventional wheels, deformation due to residual welding strains or subsequent shrinking of the welding is a serious problem. Where, for example, the disc and rim are joined by a lap weld near the base of one of the rim flanges, the rim should closely follow the form of the tire bead. The tolerance for the rim is therefore close, especially if the rim is to hold a tubeless tire. Welding in this area may bring about deformation of the bead seat which must be avoided.

The connection of the disc and rim so that the disc edge portions forms a fillet weld with the rim between the bottom and the outer side wall of the well base assures that the weld is in a region of the disc which is likewise under compression.

The connection in such a manner provides the further advantage of facilitating welding and, particularly, of obtaining prefectly straight welding seams which increase the safety of the wheel.

A wheel constructed in accordance with the invention provides the advantage, as compared to an assembly encased under the well base of the rim, by either riveting or welding, of diminishing the stress to which the rim metal is exposed. Further, elimination of the cylindrical flange of the wheel disc encased underneath the bottom of the rim provides a saving in space, and, for a given rim diameter, increases the space available for the brake.

Another feature of the invention is a reduction of the depth of the well base of from 2% to 15% as compared to the standards set by the 1962 Year Book of the Tire and Rim Association to provide additional brake-housing space. Such reduction makes it possible to increase the radii of curvature, in a plane containing the wheel axis, of the bottom and side walls of the well base where they meet to define the outer and inner shoulders 21 and 22 and of the side walls 18 and 19 and rim seats 23 and 24 where they meet. The increase of the radii of curvature in turn diminishes the strain to which the metal is subjected and increases the space available for mounting of the brake. Also, the overall height of the rim is diminished.

Inasmuch as the new wheel may be of conventional construction where it engages the tire, the wheel is capable of holding the same type of tire casing as a conventional wheel.

The decrease in strain obtained by the various means in accordance with the invention makes it possible, without modification of the dimensions of the zones of the wheel in contact with the tire, to reduce the thickness of the metal in the wheel and consequently, to lighten the wheel maintaining equal or increased strength and to diminish the overall height of the rim.

Thus, there is provided in accordance with the invention a novel and highly effective wheel particularly adatped for use on motor vehicles such as the automobile.

Inasmuch as numerous modifications of the representative embodiment disclosed herein within the spirit and scope of the invention will occur to workmen having the ordinary skill of the art, the invention is to be construed as including all the modifications thereof within the scope of the appended claim.

I claim:

A wheel comprising (A) a rim having (1) a well base formed with (a) a bottom and (b) outer and inner side walls, said side walls bordering said bottom wall respectively on the outer and inner sides thereof and intersecting said bottom wall respectively along outer and inner shoulders (2) outer and inner tire-bead seats bordering said well base on the outer and inner sides thereof, respectively, and (3) outer and inner raised flanges bordering said outer and inner tire-bead seats on the outer and inner sides thereof, respectively, said flanges having first sides respectively intersecting said outer and inner tire-bead seats and second sides respectively opposite said first sides, said second sides being curved away from said tire-bead seats and towards the axis of said wheel through arcs of at least 120°, (B) disc means having a circumferential edge portion and a central portion, and (C) a fillet weld uniting said circumferential edge portion with said outer shoulder, said circumferential edge portion forming with said bottom wall an angle of given value and with said outer side wall an angle of given value, said given values being substantially equal, and said central portion extending outwardly of the outermost plane of said outer flange.

References Cited by the Examiner

UNITED STATES PATENTS

| 1,821,954 | 9/31 | White | 301—63 X |
| 2,545,130 | 3/41 | Ash | 301—36 |
| 2,950,142 | 8/60 | Lyon | 301—5 |

FOREIGN PATENTS

| 1,177,513 | 12/58 | France. |
| 507,801 | 6/39 | Great Britain. |
| 745,467 | 2/56 | Great Britain. |

ARTHUR L. LA POINT, *Primary Examiner.*